United States Patent Office 3,445,543
Patented May 20, 1969

3,445,543
CURED BLEND OF DIENE BLOCK COPOLYMER, OLEFIN RUBBER AND POLYSTYRENE
Jerry T. Gruver, Bartlesville, Okla., assignor to Phillips Petroleum Company, a corporation of Delaware
No Drawing. Filed Dec. 13, 1965, Ser. No. 513,583
Int. Cl. C08f *19/06, 19/08*
U.S. Cl. 260—876
8 Claims

ABSTRACT OF THE DISCLOSURE

A composition comprising a block copolymer formed from a minor amount of a conjugated diene and a major amount of a monovinyl substituted aromatic compound such as styrene, a rubbery ethylene-1-olefin copolymer, and a homopolymer of a monovinyl substituted aromatic compound such as styrene, is cured to give a thermally stable impact resistant composition.

---

This invention relates to a polymer composition and a method for making same.

Heretofore high impact polymer compositions of monovinyl substituted aromatic compounds have been made by utilizing rubbery polymers of conjugated dienes in such compositions. However, it has been found that these compositions undergo a substantial amount of deterioration upon aging at an elevated temperature. Although the use of conventional antioxidants can deter the aging deterioration phenomenon in many cases unduly large amounts, e.g. as much as three weight percent, of antioxidant are necessary in order to effect any substantial hindrance of such deterioration.

It has now been found that high impact polymer compositions of monovinyl substituted aromatics which have excellent aging characteristics without the use of any antioxidants, other than those normally employed in some of the components of the composition by the manufacturer of those components, are realized from a cross-linked mixture of a block copolymer formed from at least one conjugated diene and a major amount of at least one monovinyl substituted aromatic compound, a rubbery ethylene-1-olefin copolymer and/or terpolymer, and at least one homopolymer of at least one monovinyl substituted aromatic compound.

It has been found that this composition exhibits excellent resistance to aging at elevated temperatures whereas a high impact polymer of a monovinyl substituted aromatic compound that contains a rubbery conjugated diene polymer generally becomes brittle in a relatively short time unless a substantial quantity of antioxidant is present. The antioxidant requirements of the compositions of this invention are reduced drastically over amounts normally employed for conventional high impact polymers and in most cases the use of additional antioxidant other than what is already present in the separate components is not needed.

It has further been found that suitable compositions can be obtained by mixing only the block copolymer and the ethylene-1-olefin copolymer and eliminating the homopolymer of the monovinyl substituted aromatic compound, in which case the block or blocks of the block copolymer which consist essentially of a homopolymer of a vinyl substituted aromatic compound will take the place of the deleted homopolymer.

The method according to this invention is forming the mixture of polymeric materials as discussed above, adding a cross-linking agent and heating the resulting mixture at a temperature effective to cause cross-linking thereof. Peroxide compounds can be used for treating the compositions discussed above whether an etheylne-1-olefin copolymer or terpolymer is employed in the composition. However, when a cross-linking agent such as sulfur or sulfur-containing compounds or both are employed, the composition should contain only an ethylene-1-olefin terpolymer and not a copolymer.

It is another object of this invention to provide a new and improved method for making said compositions.

Other aspects, objects, and the several advantages of this invention will be apparent to those skilled in the art from the description and appended claims.

Generally, substantially any known homopolymer of a monovinyl substituted aromatic compound can be employed. Such homopolymers are well known in the art and are commercially available. Examples of such compounds employed for the preparation of the homopolymers are those containing from 8 to 14 carbon atoms per molecule wihch includes styrene, 3-methylstyrene, 4-methylstyrene, 4-isopropylstyrene, 2,4-dimethylstyrene, 1-vinylnaphthalene, 2-vinylnaphthalene, and the like. A preferred homopolymer is that of styrene and any commercially available, general purpose polystyrene can be used.

The block copolymers are also known in the art and commercially available. The block copolymers are formed from a minor amount of at least one conjugated diene containing from 4 to 10 carbon atoms per molecule and include 1,3-butadiene, isoprene, 1,3-pentadiene (piperylene), 1,3-hexadiene, 2,3-dimethyl-1,3-butadiene, 1,3-octadiene 4-ethyl-1,3-hexadiene, 4-phenyl-1,3-butadiene and the like. Preferred conjugated dienes are butadiene, isoprene, and piperylene. Also employed is a major amount of at least one monovinyl substituted aromatic selected from the class set forth above with respect to the homopolymers that can be employed. The block structure of the copolymer of this invention is characterized in that the molecules of the final polymer product are composed of contiguous blocks, or segments, of different polymeric types, for example, one of the blocks forming the polymer chain can be a homopolymer of a conjugated diene or a copolymer of a conjugated diene and a monovinyl substituted aromatic compound while an adjacent block in that same chain can be a homopolymer of a monovinyl aromatic compound or a different copolymer of a monovinyl aromatic compound and a conjugated diene. One or more conjugated diene copolymer blocks can be present in the block copolymer of this invention and mixtures of different block copolymers can also be used.

The conjugated diene block or blocks should be rubbery, i.e. contain from 50 to 100 weight percent of the conjugated diene based on the total weight of the conjugated diene block. The monovinyl aromatic block or bolcks are resinous and are preferably a homopolymer of a monovinyl aromatic compound but can be a copolymer which contains at least 90 weight percent of monovinyl aromatic compound based on the total weight of the monovinyl aromatic block, the remaining 10 or less weight percent being a conjugated diene or other monomer.

The block copolymer as a whole should contain from about 70 to about 98, preferably from about 80 to about 95, weight percent of vinyl-substituted aromatic compound(s) based on the total weight of the monomers employed to make the block copolymer.

The amount of polystyrene present in a block copolymer of this invention can be determined by oxidative degradation. The oxidative degradation test is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of the high molecular weight polystyrene which constitutes the homopolymer blocks of the block copolymer.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic paraffinic and cycloparaffinic hydrocarbons. The polymerization is generally carried out at a temperature within the range of from about −20 to about 150° C., preferably from about −10 to about 80° C. and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compound used as the polymerization catalyst corresponds to the formula $R(Li)_x$, wherein R is a hydrocarbon radical selected from aliphatic, cycloaliphatic, and aromatic radicals, $x$ is an integer from 1 to 4, and R has a valence equal to the integer and contains from 1 to 20 carbon atoms. Such examples include methyllithium, n-butyllithium, tert-octyllithium, phenyllithium, 4-phenylbutyllithium, eicosyllithium, cyclohexyllithium, 1,2-dilithio-1,2-diphenylethane, and the like. The amount of catalyst used will generally be at least 0.05 weight percent organolithium compound based on the total monomer to be polymerized. A hydrocarbon diluent can be employed which includes one or more hydrocarbons containing from 4 to 12 carbon atoms per molecule such as butane, pentane, benzene, cyclohexane, toluene, dodecane, and the like and mixtures thereof. Block copolymers prepared by using an organomonolithium initiator can be treated with a polyfunctional agent to terminate the polymerization and to couple together two or more block copolymers. Other suitable methods of making block copolymers can be found in U.S. Patent 3,030,346. Thus, the block copolymers can be linear or branched.

Any known and/or commercially available rubbery ethylene-1-olefin polymer can be employed. By ethylene-1-olefin rubbery polymer it is meant to include for this invention rubbery copolymers of ethylene and 1-olefins containing from 3 to 8, preferably 2 to 5, carbon atoms per molecule, inclusive, and rubbery terpolymers of ethylene, a 1-olefin as before described, and a compound which will introduce unsaturation into the rubber. Examples of suitable 1-olefins are propylene, 1-pentene, 1-octene, 3-methyl-1-butene, 4-ethyl-1-hexene, 3,3-dimethyl-1-butene, and the like and mixtures of two or more thereof.

Termonomers utilized to impart sulfur vulcanizability to the polymer include cyclic and acyclic, nonconjugated dienes having from 5 to 12 carbon atoms per molecule, for example dicyclopentadiene, 1,4-pentadiene, 1,5-hexadiene, 2-methyl-1,5-hexadiene, 3,3-dimethyl-1,5-hexadiene, 1,7-octadiene, 1,9-decadiene; ethynyl ethylenes such as vinylacetylene and isopropenylacetylene; and certain of the fulvene class of compounds such as 6,6-dimethylfulvene, 6,6-diethylfulvene, 6,6-di-n-butylfulvene, 6-tert-butylfulvene, 6 - (2 - butenyl)fulvene, 6,6 - di(3-butenyl)fulvene, 6,6 - tetramethylenefulvene, 6,6 - (2-butenylene)fulvene, 6 - methyl - 6 - ethylfulvene, 1,2,6,6-tetramethylfulvene, 1,2,6,6-tetraethylfulvene, 1,2-di-n-butylfulvene, 1,2 - dimethyl - 6,6 - diisopropylfulvene, 1,6 - dimethyl - 2 - cyclobutylfulvene, 1,6,6-trimethyl-2(2 - propenyl)fulvene, 6 - phenylfulvene, 6-methyl-6-phenylfulvene, and 6,6-dibenzylfulvene, and the like, including mixtures thereof.

Preferred ethylene-1-olefin copolymers are rubbery ethylene-propylene copolymers and rubbery ethylene-propylene-nonconjugated diene terpolymers. The ethylene-1-olefin copolymers and terpolymers of this invention can be made in many ways known in the art. Suitable methods for making these polymers are set forth in U.S. Patents 3,063,973 and 3,093,621.

When preparing the compositions of this invention, the homopolymer, block copolymer, and rubbery ethylene-1-olefin polymers are mixed together in any desired order together with a cross-linking agent and this mixture is heated to effect cross-linking of the mixture. Generally, the block copolymer is employed in the range of from about 2 to about 90 weight percent and the vulcanizable, rubbery ethylene-1-olefin copolymer and/or terpolymer is employed in the range of from about 8 to about 40 weight percent, the vinyl substituted aromatic homopolymer is employed in the range of from about 0 to about 90, preferably from a minor effective amount, e.g. about 1 weight percent, to about 90 weight percent, all percentages being based upon the total weight of polymeric compounds in the composition. The amounts of these components are adjusted to provide a composition in which the rubbery content contributed from both the ethylene-1-olefin rubber and the rubbery portion of the block copolymer is in the range of from about 10 to about 40, preferably from about 15 to about 25, weight percent based on the total weight of polymeric components in the composition. Thus, the amount of monovinyl substituted aromatic polymer contributed by the homopolymer, if present, and the resinous portion (block or blocks) of the block copolymer will vary from about 90 to about 60, preferably from about 85 to about 75, weight percent based on the total weight of polymeric components in the composition.

The compositions of this invention that can be cross linked with sulfur or sulfur-containing compounds as discussed above can use organic sulfides, organic sulfenamides, and the like, as well as known substitutes for sulfur or sulfur-containing compounds and combinations of these materials. Generally the quantity of sulfur in the free or combined form that will be employed will be from about 0.1 to about 5 weight percent based on the rubbery portion of the composition.

Peroxy compounds can also be employed and include organic and inorganic peroxides. The term "organic peroxides" is meant to include the hydroperoxides, unless otherwise stated, and to encompass compounds containing from 4 to 40 carbon atoms per molecule, inclusive. The organic peroxides can also be substituted with non-peroxy substituents such as halogen, hydroxy radicals, ether and/or ester linkages, and the like. The inorganic peroxides include calcium peroxide, barium peroxide, zinc peroxide, lead peroxide, and mixtures thereof.

Examples of suitable peroxides include:

methyl n-propyl peroxide,
diethyl peroxide,
ethyl isopropyl peroxide,
di-tert-butyl peroxide,
di-n-hexyl peroxide,
n-hexyl n-decyl peroxide,
dieicosyl peroxide,
dicyclohexyl peroxide,
dicyclopentyl peroxide, bis(2,4,6-trimethylcyclohexyl) peroxide,
bis(3,5-dichlorocyclohexyl) peroxide,
bis(4-phenylcyclohexyl) peroxide,
bis(2-cyclohexenyl) peroxide,
bis(4-methyl-2-hexenyl) peroxide,
bis(4-octenyl) peroxide,
dipropionyl peroxide,
dilauroyl peroxide,
dibenzoyl peroxide,
dicrotonyl peroxide,
dibenzyl peroxide,
dicumyl peroxide,
methyl 2-n-propyl-3-butenyl peroxide,
bis(alpha-ethylbenzyl) peroxide,
bis[diisopropyl-(4-isopropylphenyl)methyl] peroxide,
bis[dimethyl-(4-tert-butylphenyl)methyl]peroxide,
benzyl alpha-methylbenzyl peroxide,
bis[(4-chlorobenzoyl)] peroxide,
bis(2,4-dichlorobenzoyl) peroxide,
bis(2-propoxy-n-hexyl)peroxide,
n-pentyl 5,8-diphenyldodecyl peroxide,
bis(9,10-dihydroxydecyl) peroxide,
2,5-di(tert-butylperoxy)-2,5-dimethylhexane,
bis(2-hydroxyheptyl) peroxide,
tert-butyl hydroperoxide,
dodecyl hydroperoxide,
eicosyl hydroperoxide,
triacontanyl hydroperoxide,
4-methylcyclohexyl hydroperoxide,
phenylcyclohexane hydroperoxide,
3-cyclohexenyl hydroperoxide,
3-phenyl-2-cyclohexenyl hydroperoxide,
4-cyclopentyl-n-butyl hydroperoxide,
cumene hydroperoxide (dimethylphenyl-hydroperoxymethane),
diisopropylbenzene hydroperoxide [dimethyl-(4-isopropylphenyl)hydroperoxymethane],
(4-ethoxyphenyl)methyl hydroperoxide,
di-n-hexyl-4-hydroxyphenylhydroperoxymethane,
dimethyl(3-methoxyphenyl)-hydroperoxymethane,
peroxybenzoic acid,
peroxybutyric acid,
peroxydodecanoic acid,
tert-butyl peroxybenzoate,
di-tert-amyl diperoxyphthalate, and
tert-dodecyl peroxyacetate.

Peroxides formed by the oxidation of terpene hydrocarbons such as pinane, alpha-pinene, p-menthane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from about 0.35 to about 4.5 gram millimoles of peroxy oxygen (—O—O—) per 100 grams of conjugated diene in the above-described copolymer or copolymers.

The polystyrene, conjugated diene block copolymer, ethylene-1-olefin copolymer or terpolymer, and peroxy compound can be mixed or blended in any conventional manner, a primary desired result being an intimate mixture of the components. It is presently preferred that the mixing, when the peroxy compound is present, be carried out in the substantial absence of air in order to effect maximum property improvement. However, it does not appear at present to be mandatory that substantially all air be excluded, for example satisfactory results can be obtained by Banbury mixing if the Banbury is merely substantially full. Generally, any internal mixer such as a Banbury, twin screw extruder, Bradender Plastograph, and the like can be employed. Mixing in a vacuum or an inert atmosphere such as nitrogen can also be advantageously employed.

Although the mixing temperature when the peroxy compound is present in the mix is that sufficient to substantially decompose the peroxy compound, in general, the mixing temperature will most times fall in the range of from about 250 to about 600, preferably from about 300 to about 500° F. The mixing time, as with the mixing temperature, can vary widely but will generally be in the range of from about 1 to about 30, preferably from about 2 to about 15 minutes. The blend can also be heated to similar temperatures after mixing is terminated or the heating operation can overlap the mixing period and the period following the termination of the mixing operation.

The cross-linking conditions set forth relative to the peroxides are also applicable to the sulfur or other cross-linking agents set forth above.

Vulcanization accelerators, accelerator activators, reinforcing agents, extenders, plasticizers, antioxidants and fillers, like those agents employed in compounding natural and synthetic rubber, can also be employed. Fillers and reinforcing agents such as carbon black, clay, calcium silicate, talc, silica, whiting and titanium dioxide, and plasticizers such as naphthenic, aromatic, and paraffinic oils can be utilized in compounding of the compositions of this invention.

EXAMPLE I

High impact polystyrene compositions having high elongation and high tensile strength were prepared by blending a heat and light stabilized, general purpose polystyrene (Styron 673, a trademark and manufactured by the Dow Chemical Company) with an 88/12 styrene/butadiene block copolymer and vulcanizable ethylene/propylene terpolymer rubber, each used in minor amount, and bis($\alpha,\alpha$-dimethylbenzyl)peroxide to effect crosslinking of the elastomeric portions of the composition. Blending was conducted in an internal mixer (Brabender Plastograph). The chamber was flushed with nitrogen and polystyrene was introduced and mixed at slow speed until it fluxed. The block copolymer and vulcanizable ethylene/propylene rubber were added and fluxed 3 minutes under nitrogen with the mixer operating at 100 r.p.m. The peroxide was then added, the vacuum head was closed, and the chamber was evacuated. Mixing was continued at 100 r.p.m. for 7 minutes. The initial mixing temperature was about 155° C. and the final mixing temperature was about 170° C.

The block copolymer employed in the compositions was prepared in accordance with the following recipe:

| | | |
|---|---|---|
| 1,3-butadiene | parts by weight | 12 |
| Styrene | do | 88 |
| Cyclohexane | do | 1000 |
| n-Butyllithium | mhm | 1.05 |
| Temperature | ° C | 70 |
| Time | hours | 18 |
| Conversion | percent | 100 | mhm=Gram millimoles per 100 grams monomers.

All recipe ingredients were charged initially. The polymerization was conducted in an atmosphere of nitrogen. At the conclusion of the polymerization, the reaction was shortstopped with an isopropyl alcohol solution containing one part by weight per 100 weight parts polymer of trisnonylphenyl phosphite and two parts by weight per 100 weight parts polymer of thio-bis phenol. The polymer was coagulated in isopropyl alcohol, separated, and dried.

The vulcanizable ethylene/propylene rubber was a commercial ethylene/propylene/diene terpolymer manufactured by the E. I. du Pont de Nemours and Company and designated as Nordel 1070. It was characterized as follows:

| | |
|---|---|
| Propylene, weight percent | 48 |
| Unsaturation, mmoles ICI per gram polymer [1] | 1.20 |
| Raw ML–4 at 212° F. | 85 |
| Density at 20/4 | ~0.86 |

[1] An 0.5-gram sample of polymer was dissolved in a 75/25 volume mixture of carbon disulfide and chloroform, a chloroform solution of iodine chloride of known concentration (approximately 0.09–1.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

After removing the blends from the mixer, they were compression molded at 350° F. into sheets 1/16 inch in thickness. The sheets were cut into 1/2-inch strips from which dog bone specimens were machined. A 2-inch gage length was used for the test specimens and the width in the gage length area was 1/4 inch. Tensile strength and elongation were measured at a drawing rate of 0.2 inch per minute. Izod impact strength was also measured. The quantity of bis(α,α-dimethylbenzyl) peroxide used in each composition was 0.1 weight per cent based on the total blend. The quantities of polymeric materials used in each blend and physical properties of the compositions were as follows:

TABLE I

| | 1 | 2 | Polystyrene control |
|---|---|---|---|
| Polystyrene,[1] parts by weight [2] | 59 | 57.5 | 100 |
| Nordel 1070, parts by weight | 22.5 | 19.5 | |
| Block copolymers, parts by weight: | | | |
| Total block | 18.5 | 23 | |
| Diene block | 2.2 | 2.8 | |
| Rubber content of composition, parts by weight (Nordel 1070 + diene block) | 24.7 | 22.3 | |
| Gram mmoles peroxy oxygen per 100 grams rubber in composition | 1.48 | 1.67 | |
| Tensile, p.s.i. | 2,740 | 3,060 | 2,470 |
| Elongation, percent | 17 | 19 | 1 |
| Notched izod impact, ft. lbs./in | 1.55 | 1.6 | 0.2 |

[1] Styron 673.
[2] All parts by weight in this specification are based on total composition unless otherwise specified.

These data show that the compositions in runs 1 and 2 had high tensile strength, high elongation, and high impact strength whereas the polystyrene control which was mixed under similar conditions but without peroxide gave much lower values.

EXAMPLE II

In order to demonstrate the effect of accelerated aging on the compositions of this invention, a blend was prepared using the same materials employed in Example I. Another composition was prepared in a similar manner, using polystyrene and a rubbery 75/25 butadiene/styrene block copolymer to serve as a control. Each composition contined 0.1 weight percent bis(α,α-dimethylbenzyl) peroxide. No antioxidant was added in addition to that already present in the block copolymers as prepared.

The rubbery 75/25 butadiene/styrene block copolymer was prepared in n-hexane diluent using n-butyllithium as the initiator. All ingredients were charged initially. Polymerization was initiated at about 150° F. and the temperature increased to about 220° F. during the reaction. On completion of the polymerization, one part by weight per 100 weight parts rubber of a mixture of $C_{16}$ to $C_{18}$ saturated and unsaturated fatty acids was added to inactivate the catalyst and one part by weight per 100 weight parts rubber of 2,6-di-tert-butyl-4-methylphenol was added as antioxidant. The mixture was steam stripped and the wet rubber crumb was washed and dried.

The quantities of materials used in each blend, the original tensile strength and elongation, and these properties after aging were as follows:

TABLE II

| | 1 | Control |
|---|---|---|
| Polystyrene,[1] parts by weight [2] | 59 | 75 |
| Nordel 1070, parts by weight | 22.5 | |
| 88/12 styrene/butadiene block copolymer, parts by weight | 18.5 | |
| 75/25 butadiene/styrene block copolymer, parts by weight | | 25 |
| Rubber content of total composition, parts by weight | [3] 24.7 | [4] 25 |
| Gram mmoles peroxy oxygen per 100 grams rubber in composition | 1.48 | 1.48 |
| Original: | | |
| Tensile, p.s.i. | 2,790 | 3,190 |
| Elongation, percent | 31 | 23 |
| Aged at 90° C.: | | |
| Tensile, p.s.i., after 72 hours | 2,850 | 3,360 |
| Elongation, percent, after 72 hours | 30 | [6] 2 |
| Color [5] | White | Yellow |

[1] See footnote 1, Table I.
[2] See footnote 2, Table I.
[3] Nordel 1070 +diene block.
[4] Block copolymer was a rubber.
[5] All samples were white originally.
[6] The original properties of the control sample were good but it became brittle after 24 hours when aged at 90° C. The elongation dropped from 23 percent to 2.5 percent during this period and decreased to 2 percent upon further aging to 72 hours.

Composition 1, prepared according to this invention, exhibited excellent aging stability as evidenced by the fact that the elongation remained high after 72 hours of heating, i.e. the product remained flexible and this compares favorably to the control run where the product became essentially brittle. After 168 hours of heating the product of run 1 exhibited no substantial change in flexibility as compared to the change effected in the control run after 72 hours of aging.

Reasonable variations and modifications are possible within the scope of this disclosure without departing from the spirit and scope thereof.

I claim:

1. A method for making a high impact polymer composition with good aging characteristics comprising mixing based on the weight of the total polymer composition (1) 2–90 weight percent of block copolymer formed from at least one conjugated diene and at least one monovinyl substituted aromatic hydrocarbon, said block copolymer containing at least 70 weight percent monovinyl aromatic hydrocarbon compound based on the total weight of the block copolymer, at least one block of said copolymer containing from about 50 to about 100 weight percent conjugated diene based on the total weight of the conjugated diene block and at least one block of said copolymer containing from about 90 to about 100 weight percent monovinyl substituted aromatic hydrocarbon based on the total weight of the monovinyl substituted aromatic block, (2) 8–40 weight percent of a rubbery ethylene-1-olefin copolymer, and (3) about 1 to about 90 weight percent of at least one homopolymer of at least one monovinyl substituted aromatic hydrocarbon compound, the total amount of rubbery components in said composition derived from (1) and (2) being in the range of from about 10 to about 40 weight percent based on the total weight of the composition, and (4) an effective cross-linking amount of a cross-linking agent selected from the group consisting of organic and inorganic peroxides, and free or combined sulfur, and heating to at least 250° F. to cross-link said mixture.

2. The method according to claim 1 where the ethylene-1-olefin copolymer is a terpolymer, the cross-linking agent is at least one of sulfur and sulfur-containing compounds and mixtures thereof, present in an amount sufficient to supply from about 0.1 to about 5 weight percent of sulfur per 100 parts of composition, and the composition is cross-linked by heating at a temperature of from about 250 to about 400° F.

3. The product according to the process of claim 2.

4. The method according to claim 1 wherein the cross-linking agent is an organic peroxide or hydroperoxide containing from 4 to 40 carbon atoms per molecule or an inorganic peroxide or mixtures thereof.

5. A method according to claim 4 wherein said rubbery ethylene-1-olefin copolymer is a terpolymer of ethylene, at least one 1-olefin containing from 3 to 8 carbon atoms per molecule, and at least one compound selected from the group consisting of cyclic and acyclic nonconjugated dienes having from 5 to 12 carbon atoms per molecule, inclusive, ethynyl ethylenes, and fulvenes.

6. A method according to claim 4 wherein the said block copolymer is formed from butadiene and styrene, said ethylene-1-olefin copolymer is a terpolymer formed from ethylene, propylene, and a nonconjugated diene having from 5 to 7 carbon atoms per molecule, inclusive, and said homopolymer is polystyrene.

7. A method according to claim 6 wherein said peroxide is bis ($\alpha,\alpha$-dimethylbenzyl) peroxide.

8. The method according to claim 4 wherein the peroxide is employed in the amount of from about 0.25 to about 6 gram millimoles of peroxy oxygen per 100 grams of conjugated diene in the composition.

References Cited

UNITED STATES PATENTS

| | | | |
|---|---|---|---|
| 2,844,562 | 7/1958 | Ingram | 260—892 |
| 3,129,199 | 4/1964 | Lunk | 260—880 |
| 3,230,186 | 1/1966 | Kreigich et al. | 260—4 |
| 3,231,635 | 1/1966 | Holden et al. | 260—880 |
| 3,239,478 | 3/1966 | Harlan. | |
| 3,251,905 | 5/1966 | Zelinski. | |

GEORGE F. LESMES, *Primary Examiner.*

U.S. Cl. X.R.

260—880, 889